United States Patent
Chang et al.

(10) Patent No.: US 10,695,613 B2
(45) Date of Patent: Jun. 30, 2020

(54) RESISTANCE SENSING APPARATUS FOR EXERCISE EQUIPMENT

(71) Applicant: Peloton Interactive, Inc., New York, NY (US)

(72) Inventors: Yao-Jen Chang, Taichung (TW); Chen-Fei Yang, Taichung (TW)

(73) Assignee: Peloton Interactive, Inc., New York, NY (US)

(*) Notice: Subject to any disclaimer, the term of this patent is extended or adjusted under 35 U.S.C. 154(b) by 84 days.

(21) Appl. No.: 16/016,446

(22) Filed: Jun. 22, 2018

(65) Prior Publication Data

US 2018/0369642 A1    Dec. 27, 2018

Related U.S. Application Data

(60) Provisional application No. 62/574,710, filed on Oct. 19, 2017.

(30) Foreign Application Priority Data

Jun. 22, 2017  (TW) .............................. 106120943 A
Jul. 4, 2017   (CN) .......................... 2017 1 0537183
(Continued)

(51) Int. Cl.
*G01L 3/00* (2006.01)
*A63B 24/00* (2006.01)
(Continued)

(52) U.S. Cl.
CPC ...... *A63B 24/0062* (2013.01); *A63B 21/0051* (2013.01); *A63B 21/00069* (2013.01);
(Continued)

(58) Field of Classification Search
CPC .......... A63B 24/0062; A63B 21/00069; A63B 21/00192; A63B 21/0051; A63B 21/225;
(Continued)

(56) References Cited

U.S. PATENT DOCUMENTS 5,039,091 A * 8/1991 Johnson ............... A63B 21/157
                                                    428/110
5,628,711 A * 5/1997 Boucher ................ A63B 69/16
                                                    434/61
(Continued)

*Primary Examiner* — Max H Noori
(74) *Attorney, Agent, or Firm* — Haynes and Boone, LLP

(57) ABSTRACT

A resistance sensing apparatus for exercise equipment includes a resistance adjusting assembly and a sensing unit. The resistance adjusting assembly includes an adjusting unit, a tubular member disposed above the adjusting unit, and an adjusting shaft mounted in the tubular member. The adjusting shaft has a first threaded portion and a second threaded portion formed thereon. The adjusting unit is threaded onto the first threaded portion. The sensing unit includes a second threaded member threadedly engaged to the second threaded portion, a first sensing member is disposed on one of the adjusting unit and the second threaded member, the second sensing member is disposed on the other of the adjusting unit and the second threaded member. By adjusting the adjusting unit and the second threaded member, a distance of the first and the second sensing member is changed and generates corresponding signals.

20 Claims, 10 Drawing Sheets

(30) Foreign Application Priority Data

Oct. 26, 2017 (TW) .............................. 106136952 A
Oct. 31, 2017 (CN) .......................... 2017 1 1051523

(51) Int. Cl.
| | | |
|---|---|---|
| *G01L 3/10* | (2006.01) | |
| *A63B 21/22* | (2006.01) | |
| *A63B 21/00* | (2006.01) | |
| *A63B 22/06* | (2006.01) | |
| *A63B 21/005* | (2006.01) | |
| *A63B 71/06* | (2006.01) | |

(52) U.S. Cl.
CPC ...... *A63B 21/00192* (2013.01); *A63B 21/225* (2013.01); *A63B 22/0605* (2013.01); *A63B 71/0619* (2013.01); *G01L 3/101* (2013.01); *A63B 71/0622* (2013.01); *A63B 2071/065* (2013.01); *A63B 2220/51* (2013.01); *A63B 2220/58* (2013.01); *A63B 2220/833* (2013.01)

(58) Field of Classification Search
CPC ............ A63B 22/0605; A63B 71/0619; A63B 71/0622; A63B 2220/51; A63B 2220/58; A63B 2220/833; G01L 3/101
USPC .................................................... 73/862.331
See application file for complete search history.

(56) References Cited

U.S. PATENT DOCUMENTS

| | | |
|---|---|---|
| 6,569,063 B2 | 5/2003 | Chen |
| 6,695,752 B2 | 2/2004 | Lee |
| 6,991,587 B1* | 1/2006 | Eschenbach ......... A63B 22/001 482/52 |
| 7,004,888 B1 | 2/2006 | Weng |
| 7,077,789 B1 | 7/2006 | Chen |
| 7,785,236 B1 | 8/2010 | Lo |
| 7,901,334 B2 | 3/2011 | Chen et al. |
| 8,052,581 B1 | 11/2011 | Lohr et al. |
| 8,585,561 B2 | 11/2013 | Watt et al. |
| 8,950,276 B2 | 2/2015 | Wu |
| 9,044,635 B2 | 6/2015 | Lull |
| 9,364,712 B2 | 6/2016 | Wu |
| 2003/0064863 A1 | 4/2003 | Chen |
| 2003/0166437 A1 | 9/2003 | Ho |
| 2004/0192514 A1* | 9/2004 | Piaget ................ A63B 22/0056 482/54 |
| 2005/0020410 A1 | 1/2005 | Chang |
| 2006/0172862 A1* | 8/2006 | Badarneh ............. A63B 22/001 482/52 |
| 2017/0312581 A1* | 11/2017 | Chang .................. A63B 21/225 |
| 2018/0207468 A1* | 7/2018 | Golesh ............... A63B 21/0125 |

* cited by examiner

RESISTANCE SENSING APPARATUS FOR EXERCISE EQUIPMENT

CROSS REFERENCE TO RELATED APPLICATIONS

The present application claims the benefit of and priority to Taiwan Patent Application Serial No. 106120943, filed Jun. 22, 2017; China Application Serial No. 201710537183.40, filed Jul. 4, 2017; Taiwan Patent Application Serial No. 106136952, filed Oct. 26, 2017; China Application Serial No. 201711051523.9, filed Oct. 31, 2017; and U.S. Provisional Application No. 62/574,710, filed Oct. 19, 2017. Each of the foregoing applications is incorporated herein by reference in its entirety.

TECHNICAL FIELD

The present disclosure relates generally to exercise equipment technology and, more particularly, to a resistance sensing apparatus for exercise equipment.

BACKGROUND

Exercise equipment is often provided with a resistance adjuster which allows the user to apply different levels of resistance to the flywheel or other similar components, according to personal training needs. In order to allow the user to know the resistance applied by the resistance adjuster during resistance adjustment, some exercise apparatuses will be equipped with a sensor. The sensor is mainly used to detect the resistance applied by the resistance adjuster, allowing the user to adjust the resistance at any time.

Taiwan Patent Number M435942 discloses a torque sensing device, which comprises a first sensing member mounted on a fixed member, a second sensing member mounted on a movable member, and an adjusting shaft rotatable to adjust the relative distance between the fixed member and the movable member for causing a change in the distance between the first sensing member and the second sensing member. In the aforesaid conventional design, only one of the first and the second sensing member is movable, while the other one is fixed. Since these structures are based on a unilateral action, the position change between the first sensing member and the second sensing member is not obvious, leading to a limitation on the sensitivity of the sensing signal.

In view of the foregoing, there is continued need in the art for improved resistance sensing designs.

SUMMARY

The present disclosure provides improved systems and methods for sensing resistance in exercise equipment. In various embodiments, a resistance sensing apparatus for exercise equipment is provided, which effectively achieves the effects of reducing the actuating stroke, shortening the sensing time and effectively improving the detection sensitivity.

To achieve this and other objects of the present disclosure, a resistance sensing apparatus comprises a resistance adjusting assembly and a sensing unit. The resistance adjusting assembly comprises an adjusting unit, a tubular member and an adjusting shaft. The adjusting unit comprises an adjusting base and a first threaded member. The adjusting base is disposed on the periphery of a flywheel and pivotally connected with one end thereof to a frame. The tubular member is mounted to the frame above the adjusting base. The adjusting shaft is inserted through the tubular member and rotatable on the axis thereof. The adjusting shaft comprises a first threaded portion and a second threaded portion. The first threaded portion and the second threaded portion have threads thereof extending in reversed directions. The first threaded member is threaded onto the first threaded portion of the adjusting shaft and pivotally connected to the adjusting base. The sensing unit comprises a second threaded member, a first sensing member and a second sensing member. The second threaded member is threaded onto the second threaded portion of the adjusting shaft of the resistance adjusting assembly. The first sensing member is mounted on one of the adjusting unit of the resistance adjusting assembly and the second threaded member of the sensing unit. The second sensing member is mounted on the other of the adjusting unit of the resistance adjusting assembly and the second threaded member of the sensing unit and disposed to face toward the first sensing member.

In general, the resistance sensing apparatus utilizes the arrangement of the reversed first and second threaded portions for enabling the adjusting unit and the second threaded member to be moved relatively to each other to further cause a change in the distance between the first sensing member and the second sensing member. As a result, the apparatus can effectively achieve the effects of reducing the actuating stroke, shortening the sensing time and improving the detection sensitivity.

Selectively, the first sensing member can be mounted on one of the adjusting base of the adjusting unit and the second threaded member of the sensing unit, and the second sensing member can be mounted on the other of the adjusting base of the adjusting unit and the second threaded member of the sensing unit.

Selectively, the first sensing member can be mounted on one of the first threaded member of the adjusting unit and the second threaded member of the sensing unit, and the second sensing member can be mounted on the other of the first threaded member of the adjusting unit and the second threaded member of the sensing unit. In one or more embodiments, the first threaded member comprises a body, and a carriage located on a front end face of the body and adapted for carrying the first sensing member or the second sensing member.

In one or more embodiments, the resistance sensing apparatus comprises a guide rod disposed adjacent to the adjusting shaft, and the second threaded member is slidably coupled to the guide rod in such a manner that when the adjusting shaft is rotated, the second threaded member is driven by the second threaded portion of the adjusting shaft and guided by the guide rod to move axially along the adjusting shaft.

In various embodiments, the guide rod is affixed to the frame or the tubular member of the resistance adjusting assembly. The second threaded member may comprise a guide hole extend through opposing top and bottom sides thereof. The guide rod may be axially slidably mounted in the guide hole. The guide rod may be axially disposed in parallel to the adjusting shaft.

In various embodiments, the second threaded member comprises a front end face, and a guide groove recessed backward from the front end face and extending through opposing top and bottom sides of the second threaded member. The guide rod may be axially slidably accommodated in the guide groove. The guide rod may be peripherally disposed in contact with two opposite inner walls of the guide groove. The diameter of the first threaded portion can be smaller than the diameter of the second threaded portion.

Other advantages and features of the present disclosure will be fully understood by reference to the following specification in conjunction with the accompanying drawings, in which like reference signs denote like components of structure.

DETAILED DESCRIPTION

Figure 1:
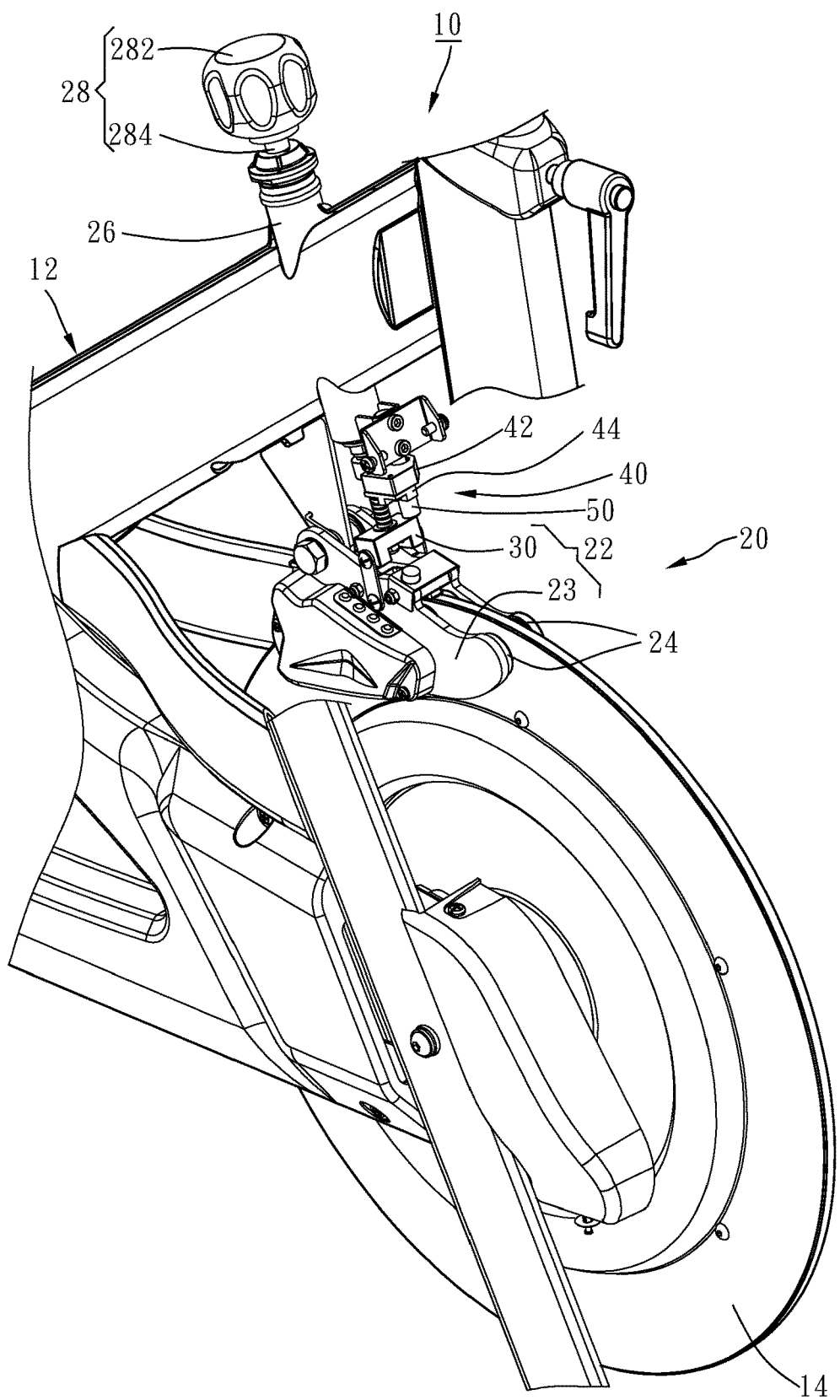
FIG. 1 is an elevational view of a resistance sensing apparatus installed in an exercise apparatus in accordance with a first embodiment of the present disclosure.
Figure 2:
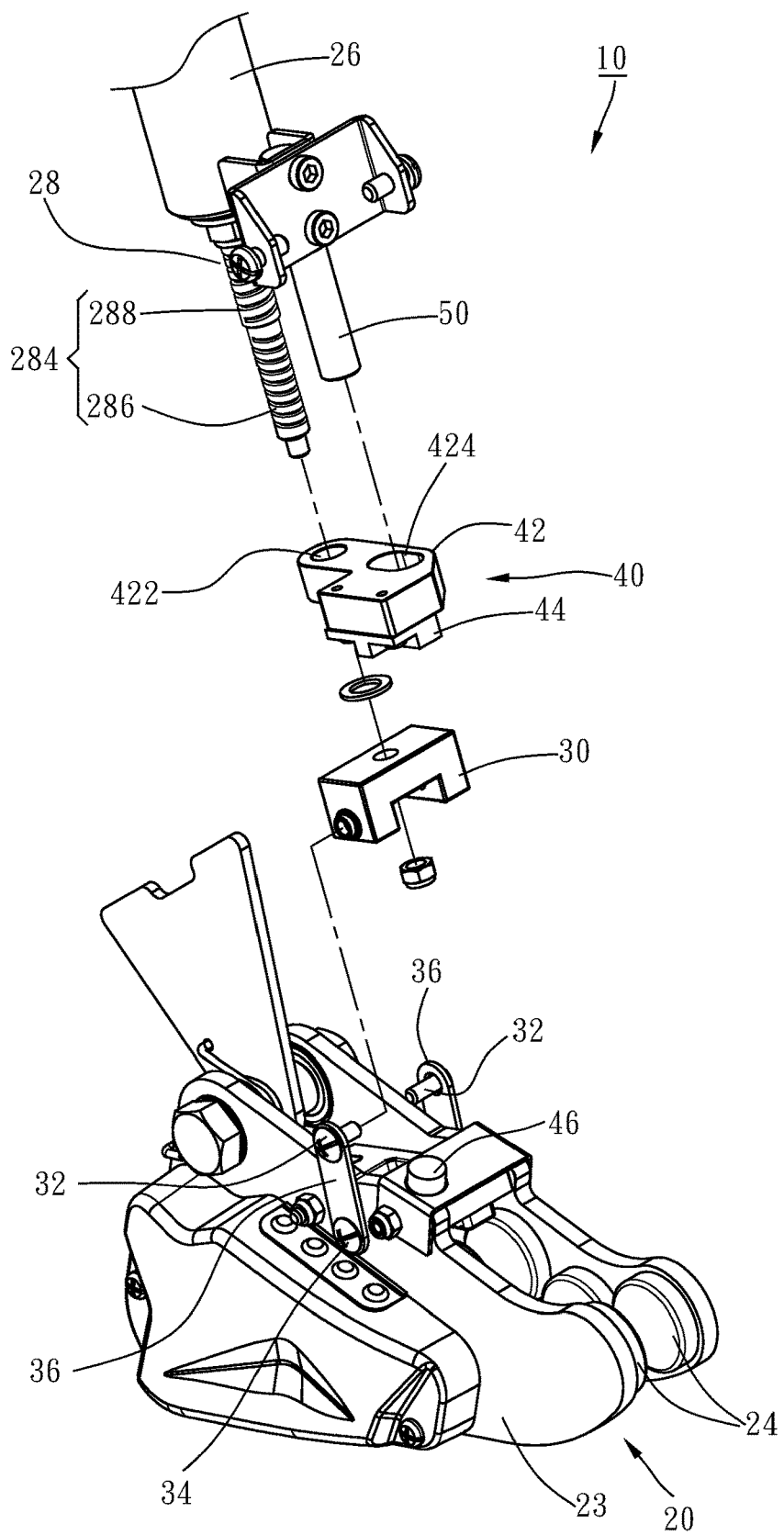
FIG. 2 is an exploded view of the resistance sensing apparatus in accordance with the first embodiment of the present disclosure.

Referring to FIG. 1, a resistance sensing apparatus 10 in accordance with a first embodiment of the present disclosure is used in an exercise apparatus that comprises a frame 12 and a flywheel 14 rotatably mounted to the frame 12. Referring to FIGS. 1-4, the resistance sensing apparatus 10 comprises a resistance adjusting assembly 20, a sensing unit 40 (also referred to as a sensor unit) and a guide rod 50.

The resistance adjusting assembly 20 comprises an adjusting unit 22, two opposing magnets 24, a tubular member 26 (e.g., a tubular sleeve), and an adjusting shaft 28.

The adjusting unit 22 comprises an adjusting base 23 and a first threaded member 30 (e.g., a threaded seat). The adjusting base 23 is disposed around the periphery of the flywheel 14 and has one end thereof pivotally connected to the frame 12. The two magnets 24 are respectively mounted in two opposite inner sides of the base 23 and respectively kept apart from the flywheel 14 at a predetermined distance. The tubular member 26 is mounted to the frame 12 above the adjusting base 23. The adjusting shaft 28 comprises a knob 282 and a double-threaded screw 284 connected to the knob 282. The double-threaded screw 284 is mounted in the tubular member 26 and rotatable on the axis thereof, comprising a first threaded portion 286 and a second threaded portion 288. The first threaded portion 286 and the second threaded portion 288 have the threads thereof extending in reversed directions. The first threaded member 30 is threaded onto the first threaded portion 286 of the double-threaded screw 284 of the adjusting shaft 28 and pivotally connected to the base 23. In this embodiment, the first threaded member 30 further comprises two first pivot pins 32, two second pivot pins 34 and two links 36. The two links 36 have respective one ends thereof respectively pivotally connected to two opposite sides of the first threaded member 30 through the first pivot pins 32, and respective opposite ends thereof respectively pivotally connected to two opposite outer sides of the adjusting base 23 through the second pivot pins 34. The sensing unit 40 comprises a second threaded member 42, a first sensing member 44 and a second sensing member 46.

The second threaded member 42 comprises a screw hole 422 extending through opposing top and bottom sides thereof and threaded onto the second threaded portion 288 of the adjusting shaft 28 of the resistance adjusting assembly 20. The first sensing member 44 is mounted on one of the top side of the adjusting base 23 of the adjusting unit 22 of the resistance adjusting assembly 20 and the bottom side of the second threaded member 42 of the sensing unit 40, the second sensing member 46 is mounted on the other of the top side of the adjusting base 23 of the adjusting unit 22 of the resistance adjusting assembly 20 and the bottom side of the second threaded member 42 of the sensing unit 40. For example, in various embodiments if the first sensing member 44 is mounted on the top side of the adjusting base 23, the second sensing member 46 is mounted on the bottom side of the second threaded member 42, and if the first sensing member 44 is mounted on the bottom side of the second threaded member 42, the second sensing member 46 is mounted on the top side of the adjusting base 23. If either of the aforesaid two mounting methods is adopted, the first sensing member 44 and the second sensing member 46 are disposed to face toward each other. In application, the first sensing member can be a Hall sensor, and the second sensing member can be a magnet. Further, in application, the diameter of the first threaded portion 286 of the double-threaded screw 284 is smaller than the diameter of the second threaded portion 288 of the double-threaded screw 284, facilitating mounting of the second threaded member 42 onto the second threaded portion 288 of the double-threaded screw 284.

The guide rod 50 is disposed adjacent to the double-threaded screw 284 of the adjusting shaft 28. The second threaded member 42 is axially slidably coupled to the guide rod 50. When the adjusting shaft 28 is rotated by an external force, the second threaded member 42 will be driven by the second threaded portion 288 of the double-threaded screw 284 of the adjusting shaft 28 and guided by the guide rod 50 to move axially upward or downward along the adjusting shaft 28. In application, the guide rod 50 is fixedly mounted to the tubular member 26 of the resistance adjusting assembly 20. Alternatively, the guide rod 50 can be affixed to the frame 12 according to actual needs. Further, in this embodiment, the second threaded member 42 comprises a guide hole 424 cut through opposing top and bottom sides thereof. The guide rod 50 is axially slidably mounted in the guide hole 424 and peripherally disposed in contact with two opposite inside walls of the guide hole 424. Thus, when the adjusting shaft 28 is rotated by an external force, the mating relationship between the guide hole 424 and the guide rod 50 enables the second threaded member 42 to move axially along the adjusting shaft 28 and prohibits the second threaded member 42 from turning about the adjusting shaft 28. In some embodiments of the present disclosure, the guide rod 50 is disposed in parallel to the axis of the adjusting shaft 28 and the inner diameter of the guide hole 424 is substantially equal to the outer diameter of the guide rod 50, however, these configurations are not a limitation.

After understanding of the structural details of the first embodiment of the present disclosure, the operation and effects of the first embodiment of the present disclosure are outlined hereinafter.

Figure 3:
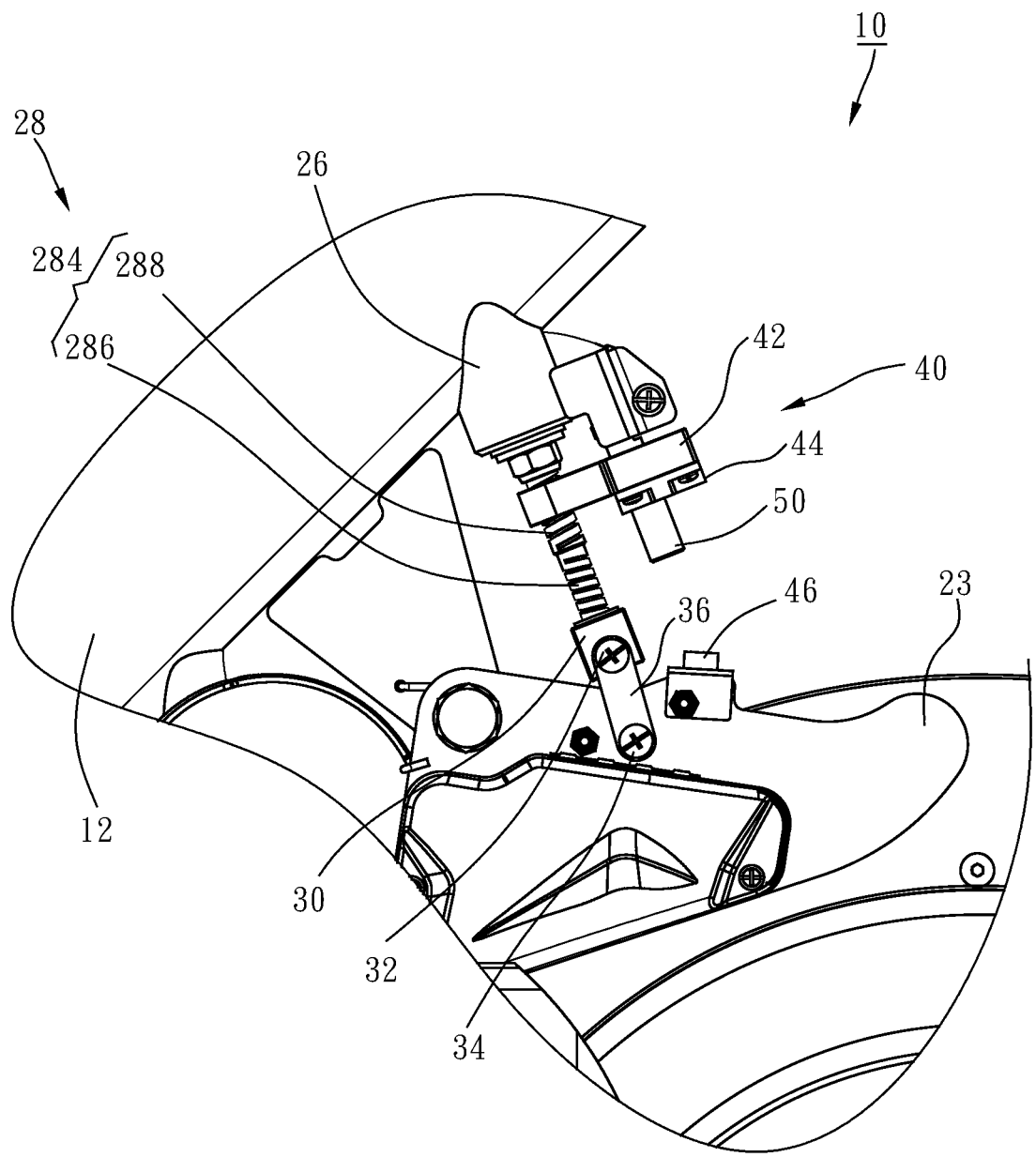
FIG. 3 is a plain view of the first embodiment of the present disclosure, illustrating the first sensing member and the second sensing member kept far from each other.
Figure 4:
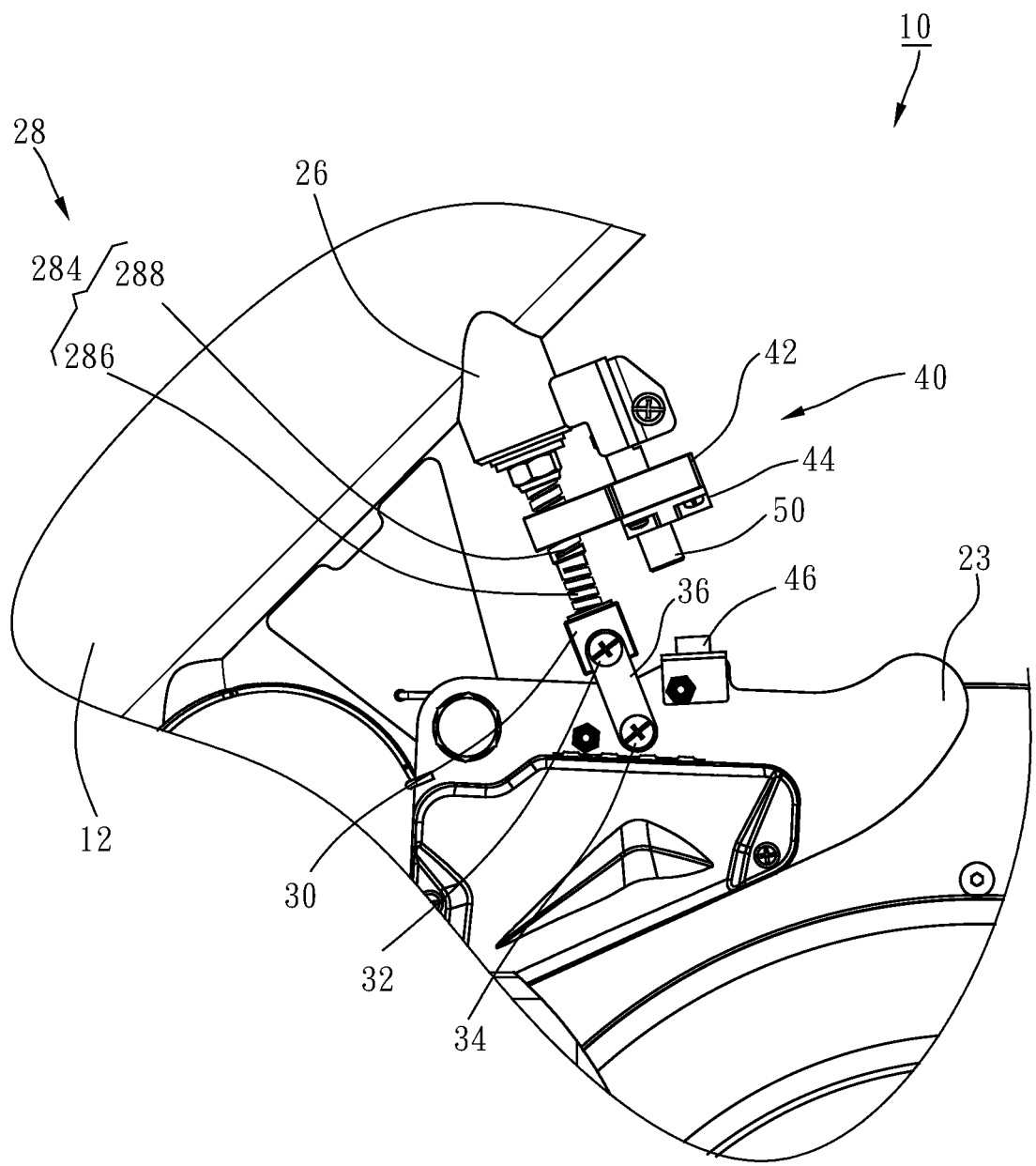
FIG. 4 is similar to FIG. 3, illustrating the first sensing member and the second sensing member moved toward each other.

Referring to FIGS. 1, 3 and 4, when a user rotates the knob 282 of the adjusting shaft 28, the first and second threaded portion 286,288 of the double-threaded screw 284 of the adjusting shaft 28 will respectively drive the first threaded member 30 and the second threaded member 42 to move axially downward or upward along the adjusting shaft 28. During displacement of the first threaded member 30, the first threaded member 30 forces the two links 36 to bias the adjusting base 23 relative to the flywheel 14. When biasing the adjusting base 23 relative to the flywheel 14, the magnetic flux between the two magnets 24 is relatively changed, causing a change in resistance to the flywheel 14. Since the threads of the first and second threaded portions 286/288 extend in reversed directions, the first and second threaded members 30 and 42 will move axially along the double-threaded screw 284 toward or apart from each other when driven by the adjusting shaft 28, and thus, the adjusting base 23 can be driven by the first threaded member 30 to move toward or away from the second threaded member 42. Thus, by means of relative movement between the adjusting base 23 and the second threaded member 42, the distance between the first sensing member 44 and the second sensing member 46 is relatively changed, causing the first sensing member 44 to provide a corresponding sensing signal to the control panel (not shown). According to the information displayed on the control panel, the user can know the variation of the resistance.

In summary, the resistance sensing apparatus 10 of the first embodiment of the present disclosure utilizes the arrangement of the reversed first and second threaded portions 286/288 and the guide rod 50 for enabling the adjusting base 23 to be driven by the first threaded member 30 to move relative to the second threaded member 42 and to further cause a change in the distance between the first sensing member 44 and the second sensing member 46. When compared with the unilateral action structure of the prior art technique, the disclosure can effectively achieve the effects of reducing the actuating stroke, shortening the sensing time and improving the detection sensitivity.

Figure 5:
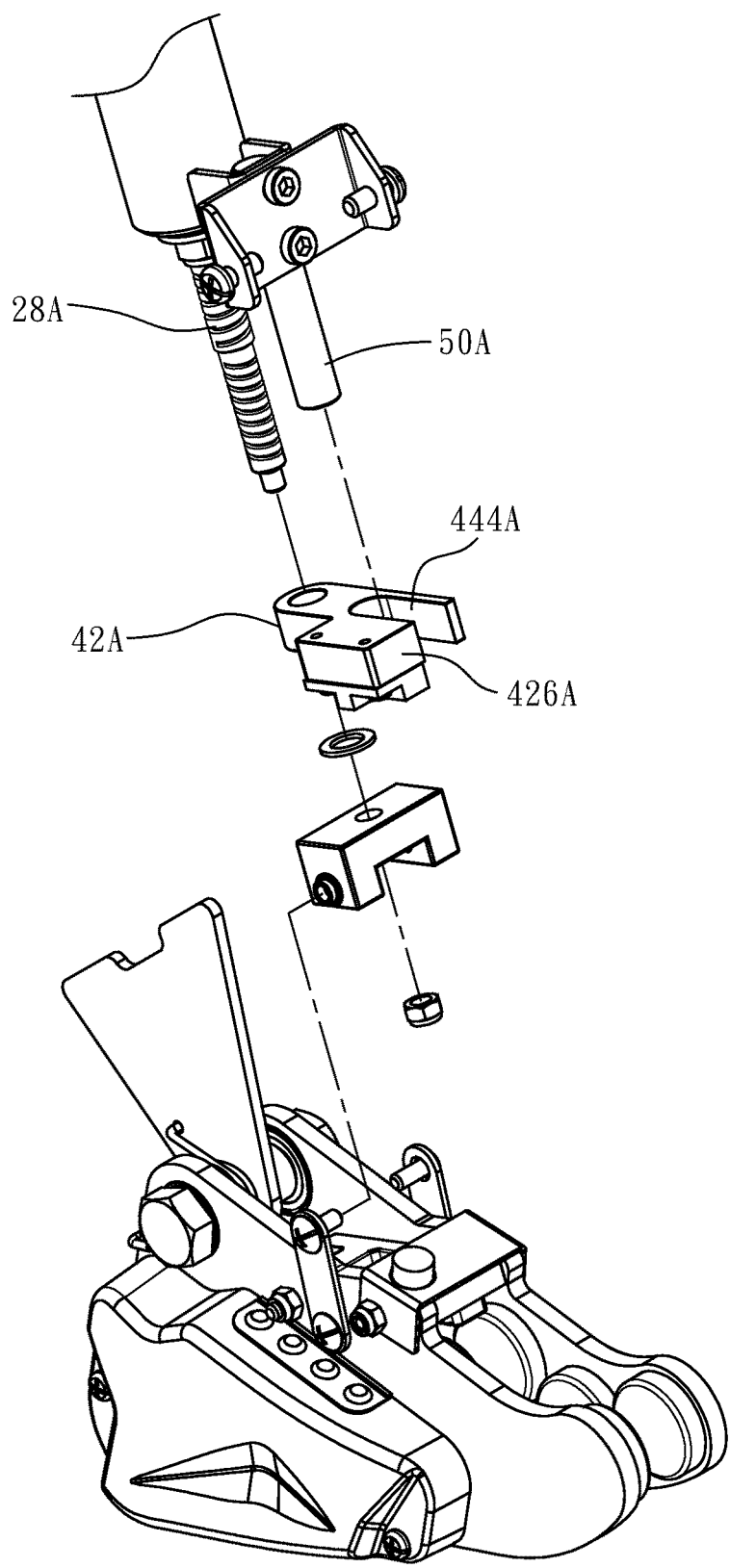
FIG. 5 is an exploded view of a part of a resistance sensing apparatus in accordance with a second embodiment of the present disclosure.

Referring to FIG. 5, a resistance apparatus 10A in accordance with a second embodiment of the present disclosure is shown. This second embodiment is similar to the aforesaid first embodiment except as set forth, below.

The second threaded member 42A comprises a front end face 426A and a guide groove 444A located on the front end face 426A and cut through opposing top and bottom sides of the second threaded member 42A. The guide rod 50A is slidably accommodated in the guide groove 444A. Further, the guide rod 50A is peripherally disposed in contact with two opposite sidewalls of the guide groove 444A. This structural design is somewhat different from the guide hole 424 of the aforesaid first embodiment, however, by means of the mating relationship between the guide groove 444A and the guide rod 50A, the second threaded member 42A can simply be forced to move along the length of the adjusting shaft 28A and is prohibited from rotation relative to the adjusting shaft 28A when the adjusting shaft 28A is rotated.

Other structural details of this second embodiment and the effects of this second embodiment may be the same as the aforesaid first embodiment.

Referring to FIGS. 6-9, a resistance apparatus 10B in accordance with a third embodiment of the present disclosure is used in an exercise apparatus, which comprises a frame 12B and a flywheel 14B rotatably mounted to the frame 12B. The resistance sensing apparatus 10B comprises a resistance adjusting assembly 20B, a sensing unit 40B and a guide rod 50B. The resistance adjusting assembly 20B comprises an adjusting unit 22B, two opposing magnets 24B, a tubular member 26B, and an adjusting shaft 28B.

The adjusting unit 22B comprises an adjusting base 23B and a first threaded member 30B. The adjusting base 23B is disposed around the periphery of the flywheel 14B and pivotally connected with one end thereof to the frame 12B. The two magnets 24B are respectively mounted in two opposite inner sides of the adjusting base 23B and kept apart from the flywheel 14B at a predetermined distance. The tubular member 26B is mounted to the frame 12B above the adjusting base 23B. The adjusting shaft 28B comprises a knob 282B and a double-threaded screw 284B connected to the knob 282B. The double-threaded screw 284B is mounted in the tubular member 26B and rotatable on the axis thereof. The double-threaded screw 284B comprises a first threaded portion 286B and a second threaded portion 288B. The first threaded portion 286B and the second threaded portion 288B have the threads thereof extending in reversed directions. The first threaded member 30B is threaded onto the first threaded portion 286B of the double-threaded screw 284B of the adjusting shaft 28B and pivotally connected to the base 23B. In this embodiment, the first threaded member 30B comprises a body 31B, two first pivot pins 32B, two second pivot pins 34B, two links 36B and a carriage 38B. The links 36B have respective one ends thereof respectively pivotally connected to two opposite sides of the body 31B of the first threaded member 30B through the first pivot pins 32B, and respective opposite ends thereof respectively pivotally connected to two opposite outer sides of the adjusting base 23B through the second pivot pins 34B. The carriage 38B is located on a front side of the body 31B.

The sensing unit 40B comprises a second threaded member 42B, a first sensing member 44B and a second sensing member 46B.

The second threaded member 42B comprises a screw hole 422B extending through opposing top and bottom sides thereof and threaded onto the second threaded portion 288B of the adjusting shaft 28B of the resistance adjusting assembly 20B. The first sensing member 44B is mounted on one of the top side of the carriage 38B of the first threaded member 30B of the adjusting unit 22B of the resistance adjusting assembly 20B and the bottom side of the second threaded member 42B of the sensing unit 40B, the second sensing member 46B is mounted on the other of the top side of the carriage 38B of the first threaded member 30B of the adjusting unit 22B of the resistance adjusting assembly 20B and the bottom side of the second threaded member 42B of the sensing unit 40B. In some embodiments, if the first sensing member 44B is mounted on the top side of the carriage 38B, the second sensing member 46B should be mounted on the bottom side of the second threaded member 42B. In some embodiments, if the first sensing member 44B is mounted on the bottom side of the second threaded member 42B, the second sensing member 46B should be mounted on the top side of the carriage 38B. Either of the aforesaid two mounting methods is adopted, the first sensing member 44B and the second sensing member 46B must be disposed to face each other. In application, the first sensing member can be a Hall sensor, and the second sensing member can be a magnet. Further, in application, the diameter of the first threaded portion 286B of the double-threaded screw 284B is smaller than the diameter of the second threaded portion 288B of the double-threaded screw 284B, facilitating mounting of the second threaded member 42B onto the second threaded portion 288B of the double-threaded screw 284B.

The guide rod 50B is disposed adjacent to the double-threaded screw 284B of the adjusting shaft 28B. The second threaded member 42B is slidably coupled to the guide rod 50B. When the adjusting shaft 28B is rotated by an external force, the second threaded member 42B will be driven by the second threaded portion 288B of the double-threaded screw 284B of the adjusting shaft 28B and guided by the guide rod 50B to move axially upward or downward along the adjusting shaft 28B. In application, the guide rod 50B is fixedly mounted to the tubular member 26B of the resistance adjusting assembly 20B. Alternatively, the guide rod 50B can be fixedly mounted to the frame 12B (not shown) according to actual needs. Further, in this embodiment, the second threaded member 42B further comprises a guide hole 424B cut through opposing top and bottom sides thereof. The guide rod 50B is axially slidably mounted in the guide hole 424B and peripherally disposed in contact with two opposite inside walls of the guide hole 424B. Thus, when the adjusting shaft 28B is rotated by an external force, the mating relationship between the guide hole 424B and the guide rod 50B enables the second threaded member 42B to move axially along the adjusting shaft 28B and is prohibited from turning about the adjusting shaft 28B. In some embodiments of the present disclosure, the guide rod 50B is axially disposed in parallel to the adjusting shaft 28B. Further, the inner diameter of the guide hole 424B is substantially equal to the outer diameter of the guide rod 50B. However, in actual application, this configuration is not a limitation.

After understanding of the structural details of the third embodiment of the present disclosure, the operation and effects of the third embodiment of the present disclosure are outlined hereinafter.

Figure 6:
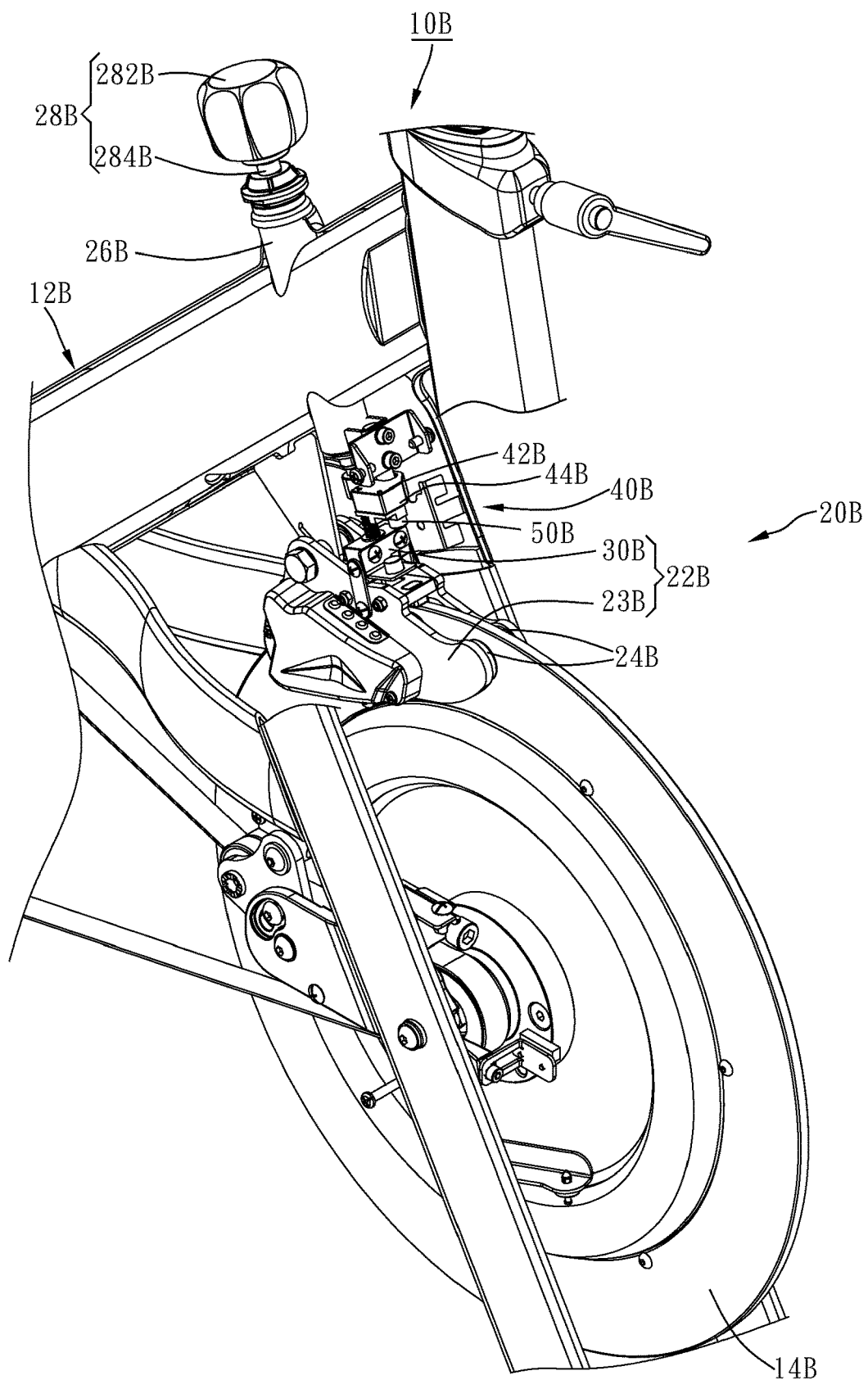
FIG. 6 is an elevational view of a resistance sensing apparatus installed in an exercise apparatus in accordance with a third embodiment of the present disclosure.
Figure 7:
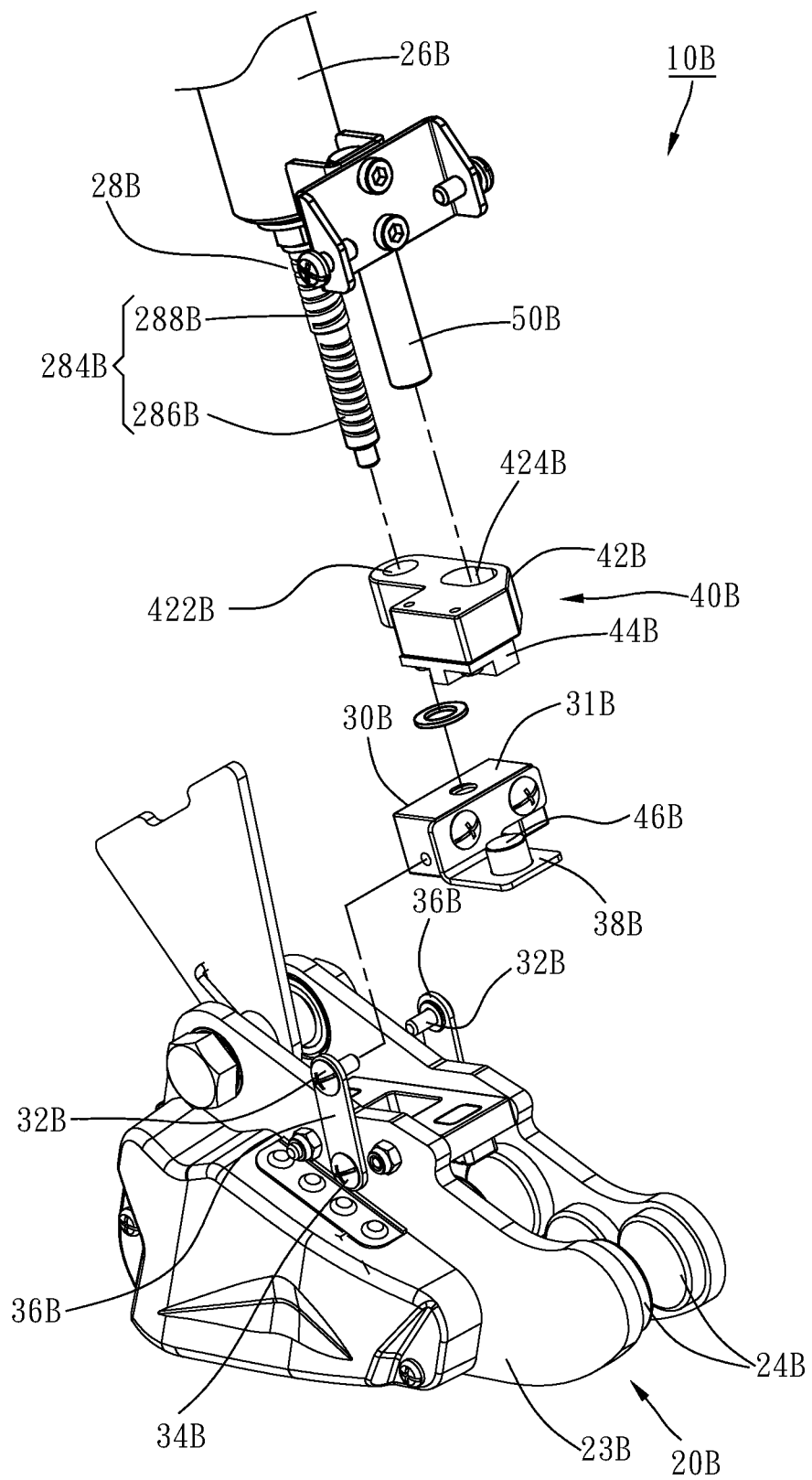
FIG. 7 is an exploded view of the resistance sensing apparatus in accordance with the third embodiment of the present disclosure.
Figure 8:
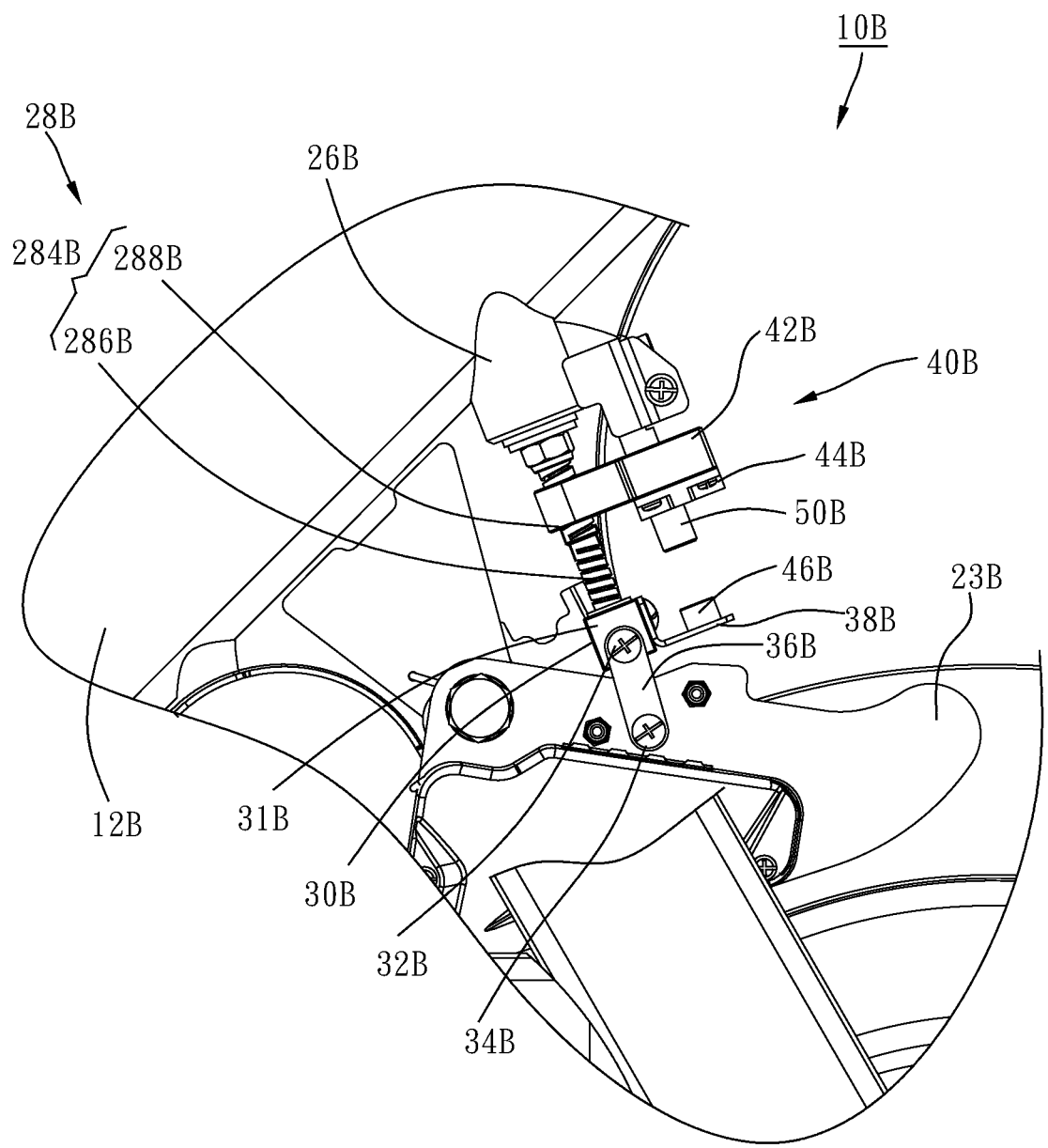
FIG. 8 is a plain view of the third embodiment of the present disclosure, illustrating the first sensing member and the second sensing member kept far from each other.
Figure 9:
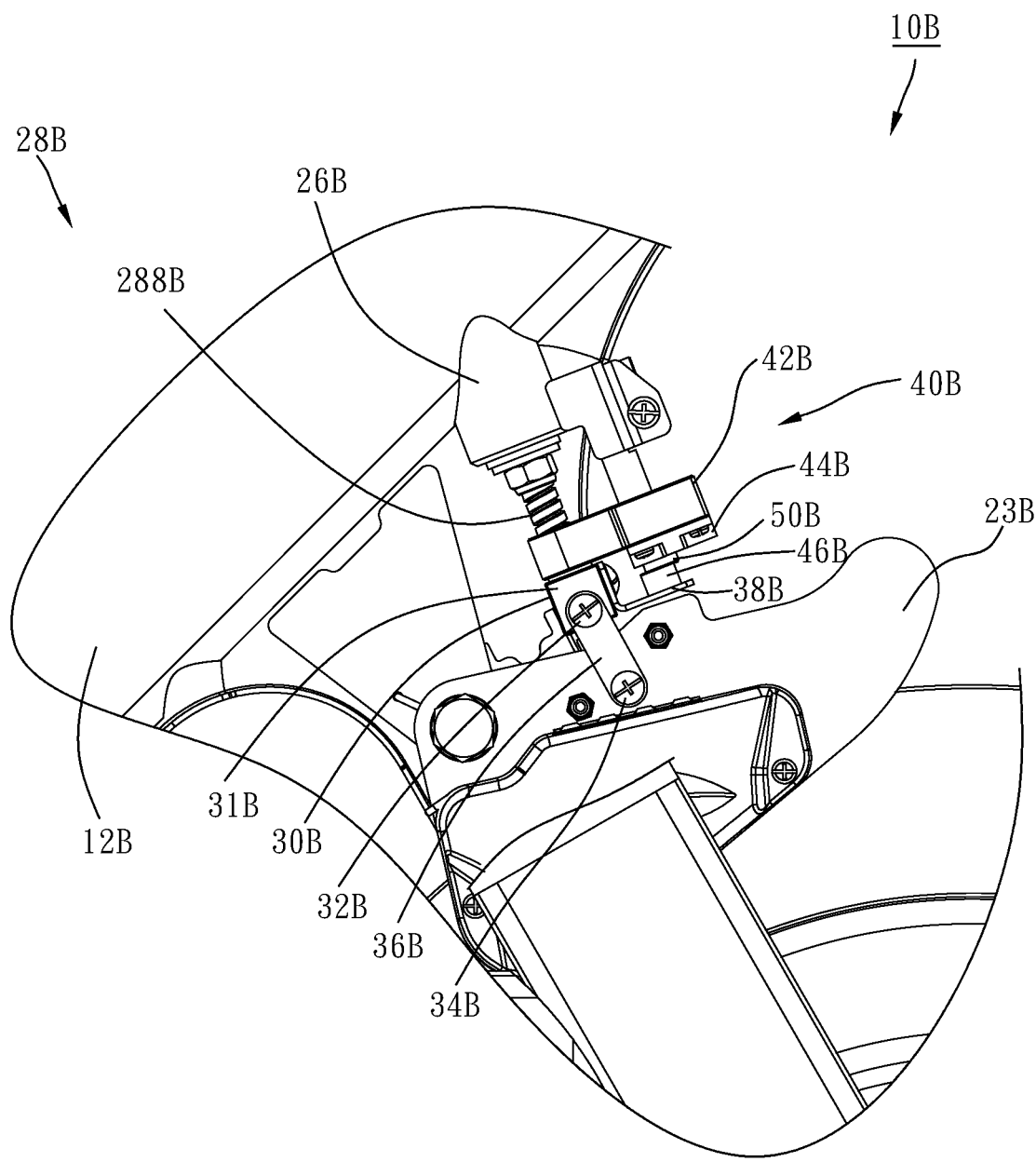
FIG. 9 is similar to FIG. 8, illustrating the first sensing member and the second sensing member moved toward each other.

Referring to FIGS. 6, 8 and 9, when a user rotates the knob 282B of the adjusting shaft 28B, the first and second threaded portions 286B and 288B of the double-threaded screw 284B of the adjusting shaft 28B will respectively drive the first threaded member 30B and the second threaded member 42B to move axially downward or upward along the adjusting shaft 28B. During displacement of the first threaded member 30B, the first threaded member 30B forces the two links 36B to bias the adjusting base 23B relative to the flywheel 14B. When biasing the adjusting base 23B relative to the flywheel 14B, the magnetic flux between the two magnets 24B is relatively changed, causing a change in resistance to the flywheel 14B. Since the threads of the first and second threaded portions 286B and 288B extend in reversed directions, the first and second threaded members 30B and 42B will move axially along the double-threaded screw 284B toward or apart from each other when driven by the adjusting shaft 28B, causing movement of the first sensing member 44B and second sensing member 46B toward or apart from each other along the double-threaded screw 284B. Once the distance between the first sensing member 44B and the second sensing member 46B is changed, the first sensing member 44B provides a corresponding sensing signal to the control panel (not shown). According to the information displayed on the control panel, the user can know the variation of the resistance.

In summary, the resistance sensing apparatus 10B of this third embodiment utilizes the reversed arrangement of the first and second threaded portions 286B and 288B for enabling the first sensing member 44B and the second sensing member 46B to be moved axially along the double-threaded screw 284B.

Since the position between the first sensing member 44B and the second sensing member 46B changes linearly but not in an arc-shaped trajectory, this third embodiment can effectively enhance the sensitivity of sensing and can also effectively reduce the non-performing rate due to adjusting unit location differences during fabrication.

Figure 10:
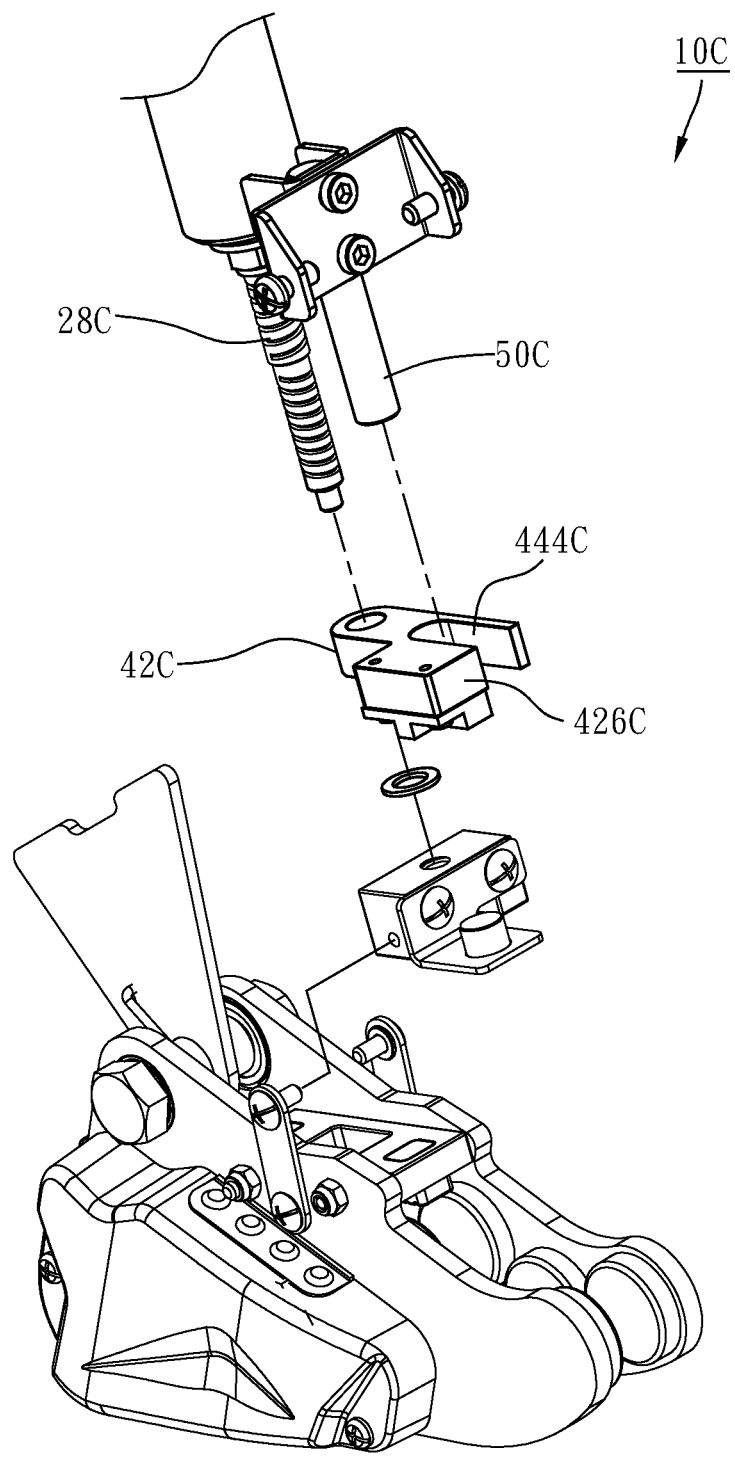
FIG. 10 is an exploded view of a resistance sensing apparatus in accordance with a fourth embodiment of the present disclosure.

FIG. 10 illustrates a resistance sensing apparatus 10C in accordance with a fourth embodiment of the present disclosure. This fourth embodiment is substantially similar to the aforesaid third embodiment except as set forth, below.

The second threaded member 42C comprises a front end face 426C, and a guide groove 444C located on the front end face 426C and extending through opposing top and bottom sides thereof. The guide rod 50C is axially slidably accommodated in the guide groove 444C with the periphery thereof disposed in contact with two opposite inside walls of the guide groove 444C.

This structural design is somewhat different from the guide hole 424B of the aforesaid third embodiment, however, by means of the mating relationship between the guide groove 444C and the guide rod 50C, the second threaded member 42C can simply be forced to move along the length of the adjusting shaft 28C and is prohibited from rotation relative to the adjusting shaft 28C when the adjusting shaft 28C is rotated.

Although particular embodiments of the disclosure have been described in detail for purposes of illustration, various modifications and enhancements may be made without departing from the spirit and scope of the disclosure. Accordingly, the invention is not to be limited except as by the appended claims.

What is claimed is:

1. A resistance sensing apparatus for an exercise apparatus having a frame and a flywheel rotatably mounted to the frame, the resistance sensing apparatus comprising:

a resistance adjusting assembly comprising an adjusting unit, a tubular member and an adjusting shaft, the adjusting unit comprising a adjusting base and a first threaded member, the adjusting base being disposed around a periphery of the flywheel and pivotally connected to the frame, the tubular member being mounted to the frame above the adjusting base, the adjusting shaft being inserted through the tubular member and rotatable on an axis thereof, the adjusting shaft comprising a first threaded portion and a second threaded portion, the first threaded portion and the second threaded portion having threads in reversed directions, the first threaded member being threaded onto the first threaded portion of the adjusting shaft and connected to the adjusting base; and a sensing unit comprising a second threaded member, a first sensing member and a second sensing member, the second threaded member being threaded onto the second threaded portion of the adjusting shaft of the resistance adjusting assembly, and wherein the first sensing member is mounted on one of the adjusting unit of the resistance adjusting assembly and the second threaded member of the sensing unit and the second sensing member is mounted on the other of the adjusting unit of the resistance adjusting assembly and the second threaded member of the sensing unit and disposed to face toward the first sensing member.

2. The resistance sensing apparatus of claim 1, wherein the first sensing member is mounted on one of the adjusting base of the adjusting unit and the second threaded member of the sensing unit, and the second sensing member is mounted on the other of the adjusting base of the adjusting unit and the second threaded member of the sensing unit.

3. The resistance sensing apparatus of claim 1, wherein the first sensing member is mounted on one of the first threaded member of the adjusting unit and the second threaded member of the sensing unit, and the second sensing member is mounted on the other of the first threaded member of the adjusting unit and the second threaded member of the sensing unit.

4. The resistance sensing apparatus of claim 3, wherein the first threaded member comprises a body and a carriage located on a front end face of the body and operable to carry one of the first sensing member and the second sensing member.

5. The resistance sensing apparatus of claim 4, wherein the resistance sensing apparatus comprises a guide rod disposed adjacent to the adjusting shaft; and wherein the second threaded member is slidably coupled to the guide rod in such a manner that when the adjusting shaft is rotated the second threaded member is driven by the second threaded portion of the adjusting shaft and guided by the guide rod to move axially along the adjusting shaft.

6. The resistance sensing apparatus of claim 5, wherein the guide rod is selectively affixed to one of the frame and the tubular member of the resistance adjusting assembly.

7. The resistance sensing apparatus of claim 6, wherein the second threaded member comprises a guide hole extended through opposing top and bottom sides thereof; and wherein the guide rod is axially slidably mounted in the guide hole.

8. The resistance sensing apparatus of claim 7, wherein the guide rod is axially disposed in parallel to the adjusting shaft.

9. The resistance sensing apparatus of claim 6, wherein the second threaded member comprises a front end face and a guide groove recessed backward from the front end face and extending through opposing top and bottom sides of the second threaded member; and wherein the guide rod is axially slidably accommodated in said guide groove.

10. The resistance sensing apparatus of claim 1, wherein a diameter of the first threaded portion is smaller than the diameter of the second threaded portion.

11. A resistance sensing apparatus for an exercise apparatus having a frame and a flywheel rotatably mounted to the frame, the resistance sensing apparatus comprising:
a resistance adjusting assembly comprising an adjusting unit, a tubular sleeve an adjusting shaft and a first threaded seat, wherein the adjusting unit is disposed on a periphery of the flywheel and one end of the adjusting unit pivotally mounted to the frame, wherein the tubular sleeve is mounted to the frame and disposed above the adjusting unit, wherein the adjusting shaft is rotatably mounted through the tubular sleeve and comprising a first threaded portion and a second threaded portion respectively extending in reversed directions, the first threaded seat being threaded onto the first threaded portion of the adjusting shaft and pivotally connected to the adjusting unit;
a sensor unit comprising a second threaded seat, a first sensing member and a second sensing member, the second threaded seat comprising a screw hole extending through opposing top and bottom sides thereof and threaded onto the second threaded portion of the adjusting shaft, the first sensing member being mounted on one of the adjusting unit of the resistance adjusting assembly and the second threaded portion of the sensor unit, the second sensing member is mounted on the other of the adjusting unit of the resistance adjusting assembly and the second threaded seat of the sensor unit and disposed to face toward the first sensing member; and
a guide rod disposed adjacent to the adjusting shaft and the second threaded seat slidably connected to the guide rod, wherein when the adjusting shaft is rotated, the second threaded seat is driven by the second threaded portion of the adjusting shaft and guided by the guide rod to move axially along the adjusting shaft.

12. The resistance sensing apparatus of claim 11, wherein the guide rod is selectively affixed to one of the frame and the tubular sleeve of the resistance adjusting assembly.

13. The resistance sensing apparatus of claim 12, wherein the second threaded seat comprises a guide hole cut through opposing top and bottom sides thereof; and wherein the guide rod is axially slidably inserted through the guide hole.

14. The resistance sensing apparatus of claim 13, wherein the guide rod is peripherally disposed in contact with two opposite inner walls of the guide hole.

15. The resistance sensing apparatus of claim 14, wherein the guide rod is axially disposed in parallel to an axis of the adjusting shaft.

16. The resistance sensing apparatus of claim 14, wherein an inner diameter of the guide hole is substantially equal to an outer diameter of the guide rod.

17. The resistance sensing apparatus of claim 12, wherein the second threaded seat comprises a front end face and a guide groove, the guide groove recessed backward from the front end face and extending through opposing top and bottom sides of the second threaded seat; and wherein the guide rod is axially slidably mounted in the guide groove.

18. The resistance sensing apparatus of claim 17, wherein the guide rod is peripherally disposed in contact with two opposite inner walls of the guide groove.

19. The resistance sensing apparatus of claim 11, wherein an inner diameter length of the first threaded portion is smaller than the inner diameter length of the second threaded portion.

20. The resistance sensing apparatus of claim 11, wherein the first sensing member is a Hall sensor; and wherein the second sensing member is a magnet.

* * * * *

UNITED STATES PATENT AND TRADEMARK OFFICE
CERTIFICATE OF CORRECTION

PATENT NO. : 10,695,613 B2
APPLICATION NO. : 16/016446
DATED : June 30, 2020
INVENTOR(S) : Yao-Jen Chang and Chen-Fei Yang It is certified that error appears in the above-identified patent and that said Letters Patent is hereby corrected as shown below:

On the Title Page

Item (73), under Assignee, change "Peleton Interactive, Inc." to --Peloton Interactive, Inc.--

Signed and Sealed this
Nineteenth Day of July, 2022

Katherine Kelly Vidal
*Director of the United States Patent and Trademark Office*